United States Patent [19]
Ibaraki

[11] Patent Number: 5,187,623
[45] Date of Patent: Feb. 16, 1993

[54] THIN FILM MAGNETIC HEAD WITH SYMMETRICAL WIRE CONNECTIONS

[75] Inventor: Atsushi Ibaraki, Nakanoshima, Japan

[73] Assignee: Alps Electric Co., Ltd., Tokyo, Japan

[21] Appl. No.: 651,703

[22] Filed: Feb. 5, 1991

[30] Foreign Application Priority Data

May 2, 1990 [JP] Japan ................................. 2-25572

[51] Int. Cl.$^5$ .......................... G11B 5/60; G11B 21/16
[52] U.S. Cl. .................................................. 360/103
[58] Field of Search ....................... 360/103, 104, 102

[56] References Cited

U.S. PATENT DOCUMENTS

| | | | |
|---|---|---|---|
| 4,317,149 | 2/1982 | Elser et al. | 360/126 |
| 4,789,914 | 12/1988 | Ainslie et al. | 360/103 |
| 5,001,591 | 3/1991 | Nakashima | 360/103 |
| 5,068,759 | 11/1991 | Matsuza | 360/103 |

Primary Examiner—John H. Wolff
Attorney, Agent, or Firm—Guy W. Shoup; B. Noel Kivlin; Patrick T. Bever

[57] ABSTRACT

A thin-film magnetic head having a slider and electromagnetic transducers provided at an end portion on one side of the slider. The magnetic head comprises a plurality of wire connecting portions connected with the electromagnetic transducers and arranged in a row on the surface of the slider which is opposite to that surface of the slider facing a magnetic recording medium. Such a thin-film magnetic head is manufactured by preparing a pair of thin-film magnetic head preforms which each have a plurality of wire connecting portions, and which are positioned in symmetrical relation to each other with their respective wire connecting portions disposed in mutual back-to-back abutment, the mutually abutting wire connecting portions each consisting of an electrode. The preforms are then bisected so as to obtain two thin-film magnetic heads.

1 Claim, 3 Drawing Sheets

5,187,623

THIN FILM MAGNETIC HEAD WITH SYMMETRICAL WIRE CONNECTIONS

BACKGROUND OF THE INVENTION

1. Field of the Invention

The present invention relates to a thin-film magnetic head used to record information on and reproduce information from a magnetic recording medium such as a magnetic disk.

2. Description of Related Art

As shown in FIG. 4, a conventional thin-film magnetic head mounted on a magnetic disk drive apparatus has a slider 10 serving as the main body of the head, and a pair of air bearing rails 11A and 11B projecting from the front side (i.e., the lower side, as viewed in the figure) of the slider 10 and extending longitudinally thereof. The air bearing rails 11A and 11B face a magnetic recording medium (not shown), such as a magnetic disk. Air inlet portions 12A and 12B for floating the magnetic head are formed at one end of each of the air bearing rails 11A and 11B, respectively, while air outlet portions 13A and 13B are formed at the respective other ends. Thin-film electromagnetic transducers 14A and 14B are provided at the same end of the slider 10 as the air outlet portions 13A and 13B. Leading terminals are extended from the electromagnetic transducers 14A and 14B, and are connected with a plurality of wire connecting portions, more specifically, bonding pads 21A, 21B, 22A, 22B, 23A and 23B, which are formed on the same plane. The electromagnetic transducers 14A and 14B, and the bonding pads 21A, 21B, 22A, 22B, 23A and 23B are all provided on the same side surface of the slider 10, and these members are arranged in a pattern which is symmetrical with respect to the central axis of the side surface, and which is repeated vertically.

As shown in FIG. 5, the thin-film electromagnetic transducer 14A on the side of the air bearing rail 11A includes a recording and reproducing coil 16A formed as a film coiled with an insulator layer 15A between the turns, leading terminals 17A, 18A, and 19A extended from the recording and reproducing coil 16A, and a film-shaped magnetic core 20A. The recording and reproducing coil 16A has a sandwich structure at the position of the film-shaped magnetic core 20A, in which the core 20A is sandwiched from above and below. A recording and reproducing gap (not shown) is formed at the tip of the magnetic core 20A, that is, on the relevant surface of the air bearing rail 11A.

The thin-film electromagnetic transducer 14A having the above-described construction provides the following function. When electrical connection is established between, for instance, the leading terminals 17A and 19A, a magnetic field is generated from the tip of the magnetic core 20, and the magnetic field generated is used to record information on the magnetic recording medium. Information is reproduced by causing the magnetic field generated by the magnetic recording medium to be picked up by the magnetic core 20, then detected by the coil 16A. The electromagnetic transducer 14B on the side of the other air bearing rail 11B has the same construction and function. Although the magnetic head has the two electromagnetic transducers 14A and 14B, recording or reproducing is generally performed by using only one of the transducers 72.

As shown in FIG. 6, wires 30 are bonded, by means of an ultrasonic wire bonder or the like, to the bonding pads 21B, 22B and 23B by solder portions 31 so that these pads 21B to 23B are connected with an electrical circuit of the magnetic disk drive. The slider 10 is supported by gimbals 50; more specifically, the surface of the slider 10 which is opposite to that surface of the slider facing the magnetic recording medium is secured to the gimbals 50 by a resin or the like. The wires 30 have one of their respective ends bonded by the solder portions 31 to the corresponding bonding pads 21B to 23B, with the respective other ends being connected with the electrical circuit of the magnetic disk drive. In order to allow this wiring, the wires 30 are passed through a tube 40 for preventing damage to the wires 30, the tube 40 being fixed to the gimbals 50 by caulking, etc.

Recently, however, the conventional thin-film magnetic head has been found to entail the following problems.

(1) The advent of small and portable personal computers which incorporate magnetic disk drive apparatuses and which are of the so-called laptop or handheld type has led to the demands for small and portable magnetic disks which are capable of high-density recording.

In these circumstances, it has also been demanded that magnetic heads used in magnetic disk drive apparatuses be thin-film magnetic heads which are small, light, and usable in high-density recording, rather than the metal-in-gap, bulk type to which a greater part of the currently available magnetic heads belongs. The size of magnetic disks has been gradually decreasing from 3.5 inches to 2.5 inches, then to 2 inches since the advent of laptop or handheld computers. However, to reduce the size of the conventional thin-film magnetic head has been difficult since three pairs of the bonding pads 21A and 21B, 22A and 22B, and 23A and 23B are provided on the side surface of the slider 10, while being arranged in a vertically repeated pattern. If one dares to reduce the size of the magnetic head, the pattern in which the bonding pads of the conventional magnetic head are arranged results in the problem that the bonding pads are arranged too close to each other, thereby involving the risk of short-circuiting between two adjacent pad structures during the connection of leads, etc. If the bonding pads themselves are made small, there is a risk of failure in electrical insulation.

(2) During the fabrication of, for instance, the electromagnetic transducer 14A, a protective film of alumina or the like is formed by puttering on the surface of the leading terminals 17A, 18A and 19A. Therefore, when the bonding pads are to be formed, it is necessary to remove the protective film material (alumina) on that portion of the side surface corresponding to the bonding pads. The removal of the material (alumina), which is performed by an abrading method or the like, involves not only an increase in the man-hour required but also a risk of deteriorating the quality of product.

(3) The wires 30 are extended in such a manner that, while they are connected with the bonding pads 21A, 22A and 23A on the side surface of the slider 10, they are passed through the tube 40 fixed to the gimbals 50 on the surface of the slider 10 which is opposite to the magnetic recording medium facing the surface of the slider 10. Thus, the wires 30 are extended over two surfaces of the slider 10. This means that due considerations must be given so as not to cause slack, etc. In addition, it is not possible to adopt a bonding method, such as a ball bonding method or a bump solder bonding method, which is commonly, used in the wiring of ICs, thereby making it difficult to improve the efficiency of the soldering operation.

U.S. Pat No. 4,317,149 issued to Elser et al. discloses a magnetic head structure similar to that of the prior art related to the present invention as described above.

SUMMARY OF THE INVENTION

The present invention has been accomplished in view of the above-described problems, and it is directed to providing a thin-film magnetic head which is capable of meeting the demands for making magnetic heads small and highly reliable.

To this end, according to the present invention, there is provided a thin-film magnetic head having a slider and electromagnetic transducers provided at an end portion on one side of the slider, the thin-film magnetic head comprising a plurality of wire connecting portions connected with the electromagnetic transducers, the wire connecting portions being arranged in a row on the surface of the slider which is opposite to that surface of the slider facing a magnetic recording medium.

According to another aspect of the present invention, there is provided a method of manufacturing such a thin-film magnetic head, the method comprising the steps of: preparing a pair of thin-film magnetic head preforms in such a manner that they are positioned in symmetrical relation to each other with their respective wire connecting portions disposed in mutual back-to-back abutment, the mutually abutting wire connecting portions each consisting of an electrode; and bisecting the preforms so as to obtain two thin-film magnetic heads.

Each of the thin-film magnetic heads, thus manufactured, has electrode segments connected with leading terminals extended from recording and reproducing coils, which electrode segments form information transmission paths to an external apparatus, such as a disk apparatus, for controlling the recording and reproduction of information.

DETAILED DESCRIPTION OF THE PREFERRED EMBODIMENT

Figure 1:
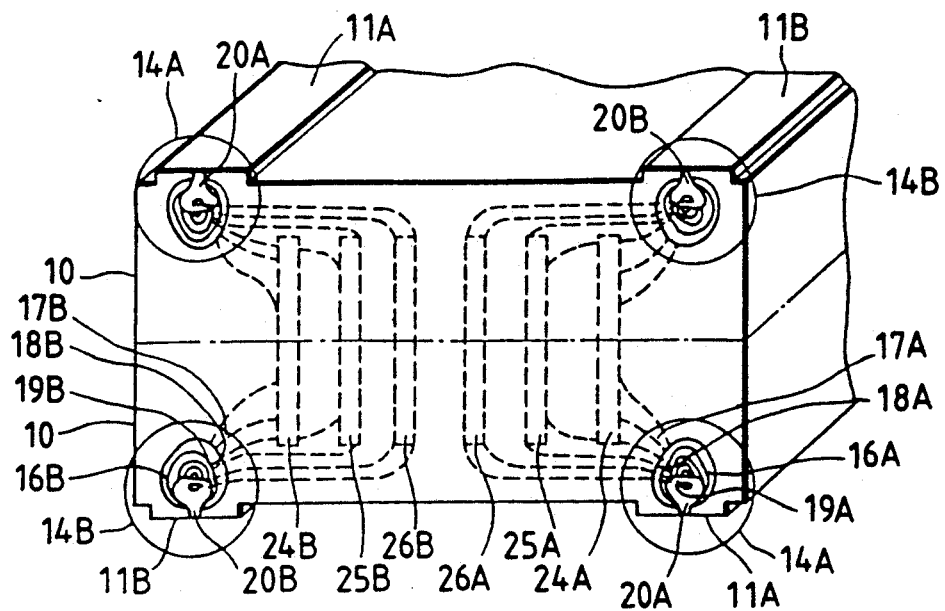
FIGS. 1 through 3 are perspective views of the essential parts of a thin-film magnetic head according to one embodiment of the present invention.
Figure 2:
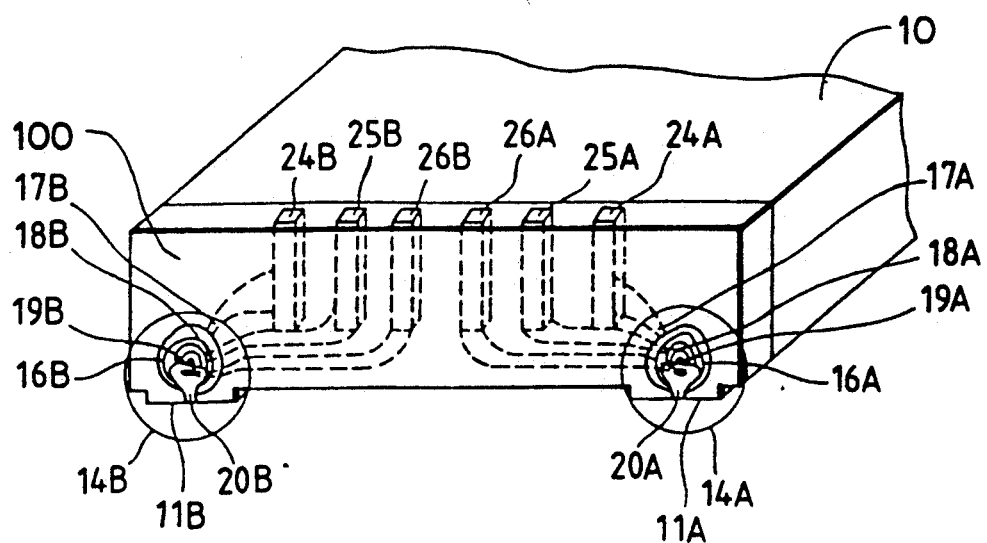
Figure 3:
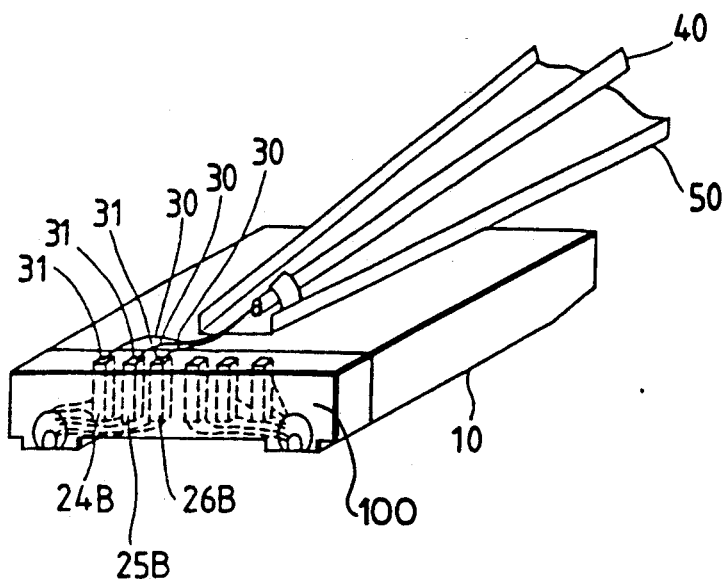
Figure 4:
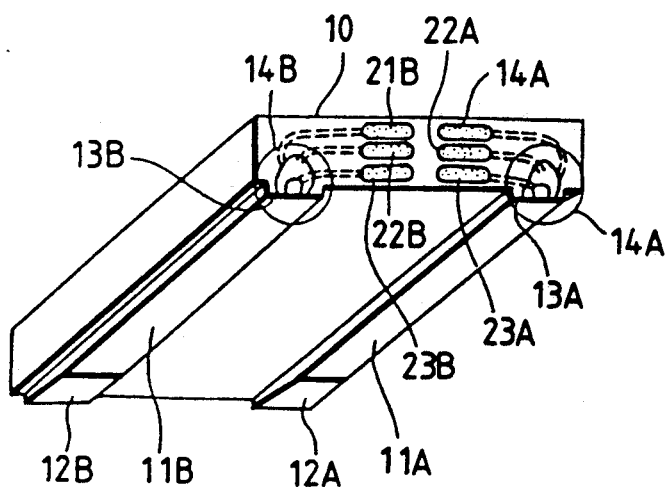
FIGS. 4 through 6 are views of a conventional thin-film magnetic head, FIGS. 4 and 6 being perspective views, FIG. 5 being a side view of the essential parts of the conventional device.
Figure 5:
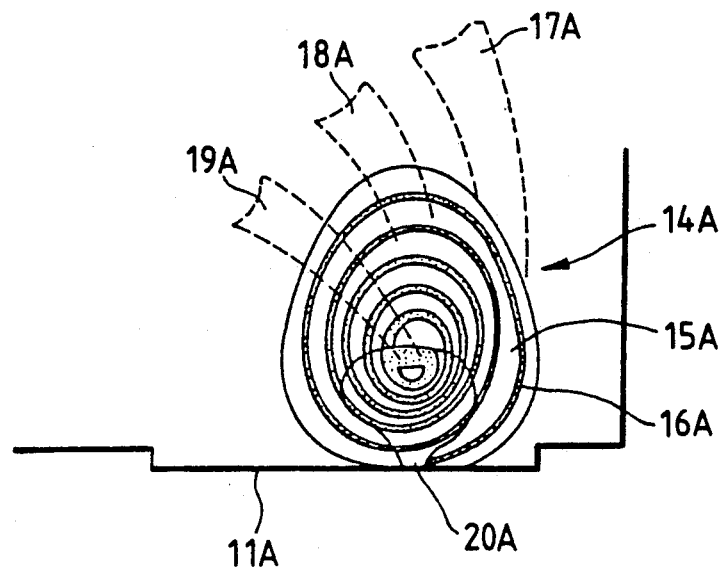

The present invention will now be described with reference to FIGS. 1 to 3 showing an embodiment thereof. In these drawings, the portions and the component parts which are the same as those of the conventional thin-film magnetic head are denoted by the same reference numerals, and the detailed descriptions of these portions or component parts will be omitted.

Similar to the conventional device, a thin-film magnetic head according to an embodiment of the present invention includes a slider 10, air bearing rails 11A and 11B formed on the slider 10, electromagnetic transducers 14A and 14B at one end of each of the rails 11A and 11B and on a side surface 100 of the slider 10, and leading terminals 17A to 19A and 17B to 19B which are extended from the electromagnetic transducers 14A and 14B, respectively. The leading terminals 17A to 19A and 17B to 19B are respectively connected with electrode portions 24A to 26A and 24B to 26B, to which wires (described later) are soldered. The electrode portions 24A to 26A and 24B to 26B are arranged in a row on the surface of the slider 10 which is opposite to that surface of the slider 10 facing a magnetic recording medium and adjacent the side surface 100. The leading terminals are extended in such a manner that, for example, the leading terminals 17A and 19A are connected with the two ends of the recording and reproducing coil 16A, while the leading terminal 18A is connected to a substantially middle portion of the coil 16A.

The leading terminals 17A, 18A and 19A are used in different manners in accordance with the input/output impedance match of an electrical signal exchanged with, for instance, a disk drive apparatus. Thus, the electrode portions 24A, 25A and 26A, which are respectively connected with the leading terminals 17A, 18A and 19A, form transmission paths through which current passes when the electromagnetic transducer 14A performs either recording of the writing data output from the disk drive apparatus or reproducing of reading data to be input to the disk drive apparatus.

The thin-film magnetic head according to this embodiment of the present invention operates in the following manner. During recording of information, two leading terminals among the leading terminals 17A to 19A connected with the electrode portions 24A to 26A, respectively, are used to establish electrical connection with an external apparatus, such as the disk drive apparatus, so that recording current is applied in accordance with the writing data to the recording and reproducing coil 16A of the thin-film electromagnetic transducer 14A. This application causes the magnetic core 20A to generate a magnetic field in accordance with the current applied, whereby a part of the magnetic recording medium is magnetized, and magnetic recording is performed. In the case of reproducing, the magnetic core 20A is magnetized by the magnetic field generated by the magnetic recording medium, which magnetization is detected by the recording and reproducing coil 16A. In this case, the reproducing current generated in the coil 16A is input, through the leading terminals 17A to 19A and the electrode portions 24A to 26A, to the disk drive apparatus, whereby reproducing is performed. The other electromagnetic transducer 14B is operable in a similar manner.

With the thin-film magnetic head embodying the present invention, since the electrode portions 24A to 26A and 24B to 26B are arranged in a row on the surface of the slider 10 which is opposite to that surface of the slider 10 facing the magnetic recording medium, it is possible to reduce the thickness of the slider 10, and hence, to reduce the size of the thin-film magnetic head. In addition, since the electrode portions can be arranged at a certain interval even when the thickness of the slider 10 is reduced, there is no risk of electrical short-circuiting between electrode portions, nor is the risk of electrical insulation failure in the wiring, etc.

Figure 6:
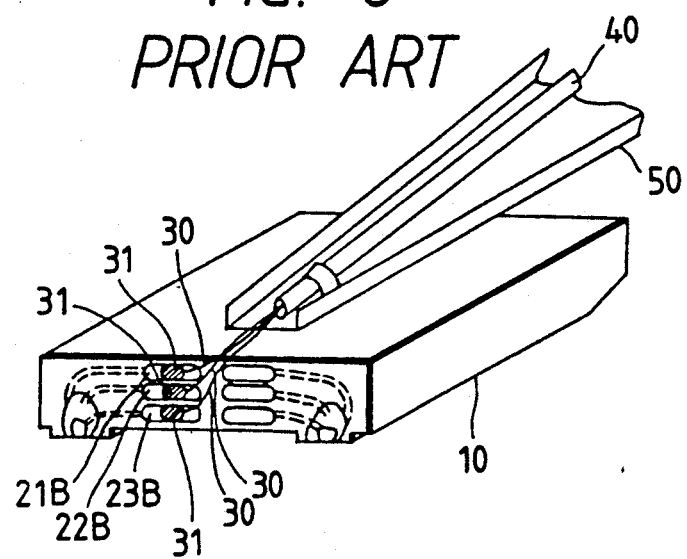

As shown in FIG. 3, the slider 10 of the thin-film magnetic head according to the present invention is supported by gimbals 50 in a manner similar to that of the conventional device (shown in FIG. 6); that is, by securing the surface of the slider 10 which is opposite to the magnetic recording medium facing surface of the slider 10 to the gimbals 50 by a resin or the like. The electrode portions 24B, 25B and 26B arranged in a row on that reverse surface of the slider 10 are connected by solder portions 31 with wires 30 for establishing connection with an electrical circuit of the magnetic disk drive, by using a method, such as a ball bonding or bump solder bonding method, which is commonly used in IC wiring. One end of each wire 30 is connected by the solder portion 31 with one of the electrodes 24B to 26B, with the other end being connected with the electric circuit of the magnetic disk drive. The wires 30 are extended in such a manner that they are passed through a tube 40 for preventing damage to the wires 30, the tube 40 being fixed to the gimbals 50 by caulking or the like.

Since the wire connecting portions consisting of electrode portions 24B, 25B and 26B are, as described above, arranged in a row on that surface of the slider 10 opposite to the magnetic recording medium facing surface of the slider 10, the wires can be connected with the electrode portions on the very surface of the slider 10 on which the tube 40 is fixed to (e.g., caulked onto) the gimbals 50. Therefore, it is possible to adopt a soldering method, such as a ball bonding or bump solder bonding method, which is commonly used in IC wiring. Thus, it is possible to perform the soldering operation with improved efficiency, while assuring the reliability and high-quality of the results of soldering.

The thin-film magnetic head according to the present invention is manufactured by the following method. As shown in FIG. 1, a pair of thin-film magnetic head preforms are prepared in such a manner that they are positioned in symmetrical relation to each other, with their respective wire connecting portions being disposed in mutual back-to-back abutment, the mutually abutting wire connecting portions each consisting of an electrode. Then, the preforms are bisected, so as to obtain two thin-film magnetic heads, each being such as that shown in FIG. 2. This manufacturing method is advantageous in that it is possible to form the wire connecting portions simultaneously with the forming of the sliders 10. Therefore, there is no need to perform operations such as the removal of alumina or other protective film material from the pertinent portion of the side surface by abrading or the like, which have conventionally been performed to form the bonding pads 21A and 21B, 22A and 22B, and 23A and 23B at the wire connecting portions. This makes it possible to reduce the man-hour required, and also to obtain high-quality thin-film magnetic heads.

As described above, according to the present invention, the wire connecting portions are arranged in a row on the surface of the slider which is opposite to the magnetic recording medium facing surface of the slider, thereby enabling reduction in the thickness of the slider. Further, even when the slider is thin, it is possible to assure that the electrode portions are arranged at a certain interval, thereby preventing the risk of electrical short-circuiting between the electrode portions. Still further, the wire connecting portions can be positioned on the same surface as the portion where the tube is caulked onto the gimbals, thereby enabling the adoption of a soldering method, such as a ball bonding or pump solder bonding method, which is commonly used in IC wiring, etc. This makes it possible to achieve improved efficiency of the soldering operation, as well as reliable and high-quality results of the soldering.

According to another aspect of the present invention, a pair of thin-film magnetic head preforms are prepared, which preforms are positioned in symmetrical relation to each other, with their respective wire connecting portions being disposed in mutual back-to-back abutment, the mutually abutting wire connecting portions each consisting of an electrode. The preforms are bisected, so as to obtain two thin-film magnetic heads. This method of manufacturing a thin-film magnetic head is advantageous in that the wire connecting portions can be formed simultaneously with the forming of the slider. In contrast with the conventional method in which the forming of bonding pads at the wire connecting portions requires such operations as the removal of alumina, etc. from the pertinent portion of the side surface by abrading or the like, the method according to the present invention makes these operations unnecessary. Therefore, the man-hour required can be greatly reduced, while enabling the manufacture of highly-reliable, high-quality thin-film magnetic heads.

What is claimed is:

1. A thin-film magnetic head having a slider and electromagnetic transducers disposed on a side surface of said slider, said thin-film magnetic head comprising a plurality of wire connecting portions connected with said electromagnetic transducers, said wire connecting portions being arranged in a row on a first surface of said slider which is opposite to a second surface of said slider facing a magnetic recording medium, said row being adjacent to said side surface on which said electromagnetic transducers are provided so that these wire connecting portions are disposed on two adjacent slider surfaces.

* * * * *